Patented Oct. 22, 1935

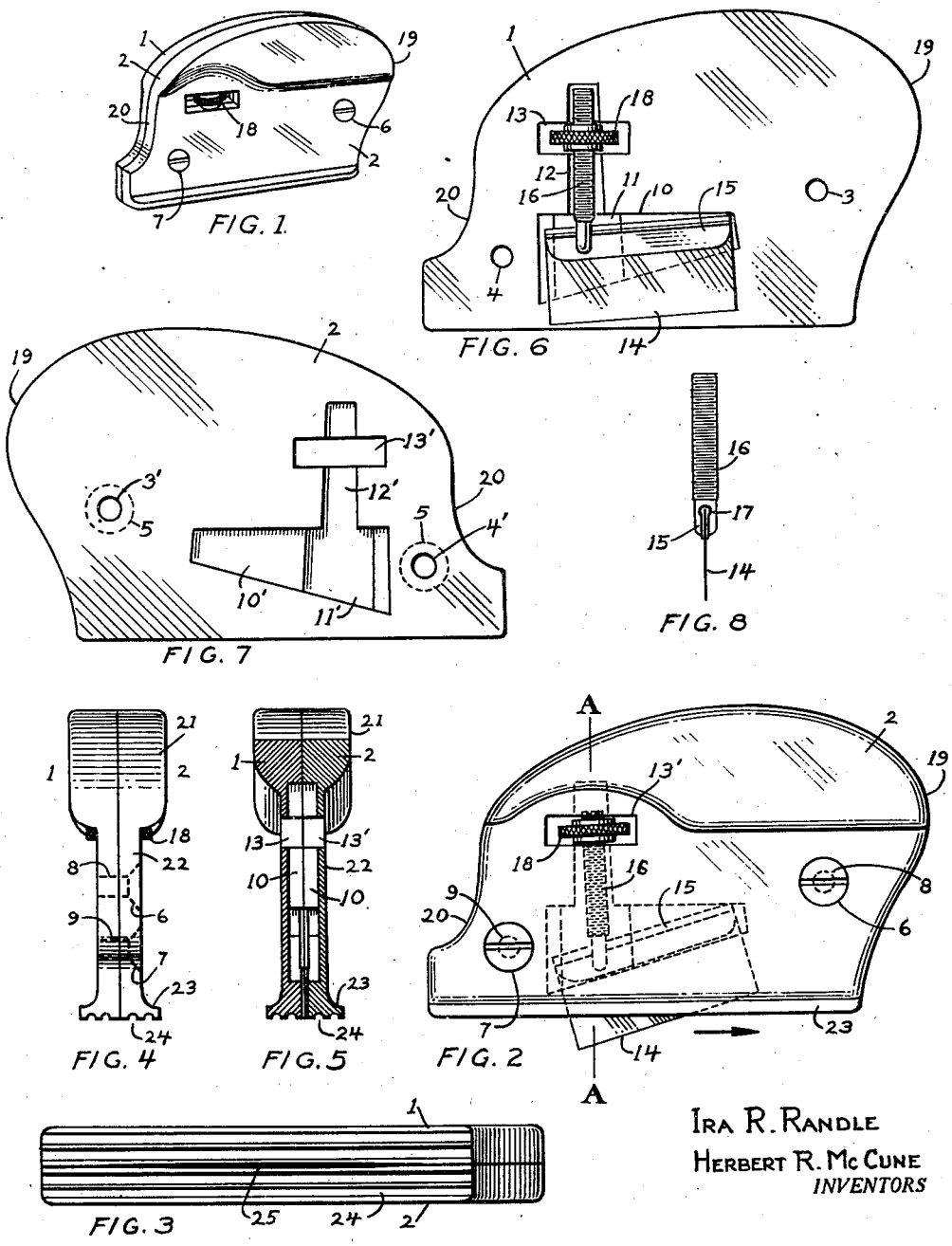

2,018,149

UNITED STATES PATENT OFFICE 2,018,149

CUTTING TOOL

Ira R. Randle and Herbert R. McCune, Decatur, Ill.

Application October 10, 1934, Serial No. 747,717

2 Claims. (Cl. 30—9)

Our invention relates to cutting devices, and particularly to tools of that class in which an edged tool is adjustably mounted in a frame or holder for making line cuts through sheets or into material at a predetermined depth.

The chief object of our invention is to provide an adjustable cutting tool for cutting through the wrappings of commercial packages such as those containing cigarettes, candy, and the like, without cutting into or mutilating the carton.

A further object of the invention is to provide an adjustable cutting tool which may be utilized to cut long cartons into shorter sections without danger of injury to the smaller individual containers within the carton.

A general object of our invention is to provide an adjustable edged cutting tool, suitable for a variety of purposes, and of simple and inexpensive construction.

In the drawing accompanying this specification and forming a part thereof:

Fig. 1 is a perspective view of my improved cutting tool;

Fig. 2 is a side elevation thereof;

Fig. 3 is a bottom plan view;

Fig. 4 is an end view;

Fig. 5 is a transverse section taken on the line A—A of Fig. 2;

Fig. 6 is a side view showing one half section of the holder removed and with the cutting blade exposed to view;

Fig. 7 is a view of the detached half section removed from Fig. 6; and

Fig. 8 is an end view of the cutting blade with adjusting screw.

Referring to the drawing, like reference numerals indicate like parts in the several views.

The frame or blade holder comprises a pair of plate members 1 and 2 of any suitable material, such as aluminum, wood, or fibre composition, which are the same contour, thickness, and general formation, so that a detailed description of one of said members will suffice to explain the peculiar construction of each.

Referring to Fig. 6 it will be seen that the plate member 1 has through openings 3 and 4 near its opposite ends which in assembled position register with corresponding openings 3' and 4' in the plate member 2, the outer terminals of one set of openings being countersunk as indicated at 5 in Fig. 7, to receive the enlarged tapered heads 6 and 7 of the screws 8 and 9 by means of which the members 1 and 2 are rigidly secured together. The opposite ends of the screws 8 and 9 extend only to the outer surface of the plate member 1 so that the holder presents a smooth and uninterrupted surface free from danger of injury to the hand of the user.

There is formed in the inner surface of the plate member 1 a depression 10 of substantially triangular shape, merging into a deeper recess 11 near its wider end, said recess extending at right angles to the triangular depression to form a channel 12. A through window 13 is formed across the channel 12 near its outer end and at right angles thereto. Duplicate formations 10', 11', 12', and 13' are provided in plate member 2, all for a purpose which will now be described.

For a cutting blade we prefer to employ one of several makes safety razor blades now on the market in which the blade 14 is carried by a carrier 15. Such blades are of high quality and are inexpensive.

In the construction of our improved cutting tool I attach a screw 16 to the blade carrier 15 by forming a slot 17 in the end of the screw 16 and inserting the carrier in this slot. A circular knurled adjusting nut 18 mounted on the adjusting screw completes the parts required for the construction of our invention.

The parts are assembled as shown in Fig. 6 by placing the carrier 15 of the blade 14 in the depression 10 with the adjusting screw 16 lying in the channel 12, and the adjusting nut 18 in the window 13 so that the knurled periphery will extend beyond the outer surface of the plate members 1 and 2 to be manipulated by the fingers of the user. The channel 12 is slightly wider at its inner than at its outer end to permit angular movement of the adjusting screw 16 within said channel. Obviously, when plate member 2 is assembled with plate member 1 the different complementary elements will register and complete the construction.

It will be observed that the contour of plate members 1 and 2 is such as to provide a convenient grip for the user of the tool, it being intended that the palm of the hand will engage the heel 19 of the holder, and that the forefinger engage the curved front 20.

As shown in Figs. 4 and 5 the upper portion 21 of the holder is thicker than the intermediate portion 22, and that the lower edge of the holder terminates in a foot 23, the engaging surface of which consists of corrugations 24, to facilitate the sliding of the holder in a straight line during the cutting operation.

It will be seen by reference to Fig. 2 that by rotation of the adjusting nut 18 on the screw 16 the foreward end of the blade 14 may be forced a predetermined distance beyond the corrugated surface of the foot 23, so that if desired it may be adjusted to slit the Cellophane wrapper on a carton of cigarettes or the like without danger of cutting into the carton, or it may be used to cut the carton into sections without injury to the small packages inside.

The inner surface of each of the plate members 1 and 2 is slightly concaved opposite the blade portion of the cutting member to form an elongated opening 25 (see Fig. 3) through which the blade 14 is adapted to be moved without placing the walls of the plate members under strain.

As shown in Fig. 2 the cutting operation is performed by the foreward end of the blade and preferably by moving the holder in the direction indicated by the arrow to insure cutting without tearing the material.

It is to be understood that changes in the details of construction of our improved cutting device may be made within the scope of the appended claims without departing from the spirit of our invention.

Having described our invention, we claim:—

1. A cutting device comprising a holder formed of a pair of plate members terminating at their lower edges in a slidable foot, a substantially triangular depression in the inner surface of each of said plate members forming a recess therebetween, a blade carrier mounted for angular movement in said recess, a blade mounted in said carrier, an adjusting screw connected to said carrier, and a thrust nut mounted on said screw and having contact with said holder for adjusting one end of said blade a predetermined distance beyond the contact surface of said foot.

2. A line cutting device comprising a holder formed of a pair of plate members, said members being suitably curved and rounded about their upper edges to provide a hand and finger grip and having an intermediate portion of reduced thickness and terminating at their lower ends in a foot having its contact surface formed of corrugations extending the entire length of said holder, a substantially triangular depression in the inner surface of each of said plate members forming a shallow recess extending horizontally and other depressions at right-angles thereto forming a vertical recess, slightly concaved portions in the inner surfaces of said plate members forming a recess extending from the first mentioned recess to the contact surface of said foot, said last named recess being of less depth than the first named recess, a substantially U-shaped blade carrier mounted in the first named horizontal recess, adapted for angular movement therein, an edged cutting blade carried by said carrier, an adjusting screw connected to said carrier and mounted in said vertical recess, an adjusting nut mounted on said screw and in engagement with the walls of an opening through said holder for moving one end of said blade a predetermined distance beyond the contact surface of said foot, said blade moving in said lowermost recess in said holder formed by said concave portions, and said plate members being secured together by removable screws to permit replacement of blades.

IRA R. RANDLE.
HERBERT R. McCUNE.